US012675499B2

(12) United States Patent
Klein et al.

(10) Patent No.: US 12,675,499 B2
(45) Date of Patent: Jul. 7, 2026

(54) ONTOLOGY DRIVEN DATA SYNCHRONIZATION MECHANISM

(71) Applicant: Accenture Global Solutions Limited, Dublin (IE)

(72) Inventors: Dan Klein, Rosh Ha'ayin (IL); Eitan Hadar, Nesher (IL); Anna Glownia, Cracow (PL)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 821 days.

(21) Appl. No.: 18/166,318

(22) Filed: Feb. 8, 2023

(65) Prior Publication Data

US 2023/0252044 A1 Aug. 10, 2023

(30) Foreign Application Priority Data

Feb. 9, 2022 (PL) ...................................... P.440337

(51) Int. Cl.
*G06F 16/27* (2019.01)
*G06F 9/50* (2006.01)
*G06N 5/02* (2023.01)

(52) U.S. Cl.
CPC ............ *G06F 16/27* (2019.01); *G06F 9/5066* (2013.01); *G06N 5/02* (2013.01)

(58) Field of Classification Search
None
See application file for complete search history.

(56) References Cited

U.S. PATENT DOCUMENTS

2016/0080422 A1* 3/2016 Belgodere .............. G06N 5/048
706/47
2017/0105185 A1* 4/2017 Chen ..................... H04W 56/00
(Continued)

FOREIGN PATENT DOCUMENTS

CN 112966118 6/2021

OTHER PUBLICATIONS

Extended Search Report in European Appln. No. 23155829.7, dated Jun. 9, 2023, 10 pages.
(Continued)

*Primary Examiner* — Eric C Wai
(74) *Attorney, Agent, or Firm* — Mannava & Kang, P.C.

(57) ABSTRACT

Implementations include obtaining a knowledge graph comprising a computer-readable data structure and including nodes and connections between the nodes, the nodes including: data nodes each representing a computational resource, analysis nodes each representing an analysis, and source nodes each representing a source of a data element; and determining, using the knowledge graph, an access strategy and a synchronization strategy for performing an analysis, by, automatically: identifying a first source node representing a source of a data element on which the analysis is to be performed, identifying a first data node representing a computational resource on which the analysis is to run, identifying a second data node representing a computational resource on which the data element is to reside, determining the access strategy between the first source node and the second data node, and determining the synchronization strategy between the first data node and the second data node.

20 Claims, 8 Drawing Sheets

(56) References Cited

U.S. PATENT DOCUMENTS

2021/0056448 A1*  2/2021  Stepanova ............. G06N 5/022
2022/0027767 A1*  1/2022  Krishnamoorthy .... G06N 3/006

OTHER PUBLICATIONS

JuanSequeda.com [online], "What is the deal with the Data Mesh?" Feb. 22, 2021, retrieved on May 31, 2023, retrieved from URL<http://www.juansequeda.com/blog/2021/02/22/what-is-the-deal-with-the-data-mesh/>, 6 pages.
Martin et al., "The Rise of the Knowledge Graph: Toward Modern Data Integration and the Data Fabric Architecture," O'Reilly Media Inc., Mar. 19, 2021, 88 pages.
MartinFowler.com [online], "Data Mesh Principles and Logical Architecture," Dec. 3, 2020, retrieved on May 30, 2023, retrieved from URL<https://martinfowler.com/articles/data-mesh-principles.html>, 27 pages.

* cited by examiner

| Obtaining a knowledge graph representing a recommended data mesh     602 |
| Determining, using the knowledge graph, an access strategy for performing an analysis     604 |
| Determining, using the knowledge graph, a synchronization strategy for performing the analysis     606 |

ONTOLOGY DRIVEN DATA SYNCHRONIZATION MECHANISM

CROSS-REFERENCE TO RELATED APPLICATIONS

This application claims priority to Polish App. No. P.440337 filed on Feb. 9, 2022, the disclosure of which is expressly incorporated herein by reference in the entirety.

BACKGROUND

As trusted digital information flow and derived insights become more important, the challenge of managing data at scale is evident. Rapid acceleration of data- and analytics-driven solutions for enterprises is complicated by the variety and volume of data sources and the existence of multiple methods for data consumption and utilization. Organizations use many data architecture approaches to handle the above challenges such as centralized, edge, data mesh, peer-to-peer, and others.

SUMMARY

Implementations of the present disclosure are directed to systems and methods for ontology driven data synchronization mechanism. The systems are oriented on identification of data synchronization mechanisms in a distributed data mesh. A classical data mesh can include multiple data nodes that pass data between them, in different methods of communication, using external orchestrators. The disclosed systems calculate and implement assignments regarding the data that passes between data nodes, and the synchronization method used to pass the data between such data nodes automatically. In particular, the proposed system determines which data elements are to be synchronized between different data nodes, and the method of synchronization. The method of synchronization can be, for example, pull, push, replicate, remote access, or any combination of these. A driving analytics defines the data consumption model, employing a "need to know" mechanism that optimizes the data transfer between data nodes, while ensuring only relevant data is passed over the data mesh topology between data nodes.

The result is an automatic method for synchronization that enables the following capabilities and uniqueness. Visualization of the data mesh, interacting data nodes, and the type of data and data synchronization are generated. Data demand and its similarity are automatically identified, highlighting which data should be synchronized (data elements) and where it resides (at which data node). Data synchronization policy is selected (such as pull, push, replica, remote access). Types of data access to data and backup methods to implement are determined.

Implementations of the present disclosure include actions of obtaining a knowledge graph representing a recommended data mesh, the knowledge graph including a computer-readable data structure and including nodes and connections between the nodes, the nodes including: data nodes, each data node representing a computational resource, analysis nodes, each analysis node representing an analysis to be performed, and source nodes, each source node representing a source of a data element; and determining, using the knowledge graph, an access strategy and a synchronization strategy for performing an analysis, by, automatically: identifying, within the knowledge graph, a first source node representing a source of a data element on which the analysis is to be performed, identifying, within the knowledge graph, a first data node representing a computational resource on which the analysis is to run, identifying, within the knowledge graph, a second data node representing a computational resource on which the data element is to reside, determining the access strategy between the first source node and the second data node, and determining the synchronization strategy between the first data node and the second data node.

Other implementations of this aspect include corresponding systems, apparatus, and computer programs, configured to perform the actions of the methods, encoded on computer storage devices.

These and other implementations can optionally include one or more of the following features: identifying the first data node representing the computational resource on which the analysis is to run comprises identifying, within the knowledge graph, a connection between the first data node and a first analysis node representing the analysis to be performed; the nodes include ontology nodes, each ontology node representing an axiom of a data ontology, wherein identifying, within the knowledge graph, the first source node representing the source of the data element on which the analysis is to be performed comprises: identifying, within the knowledge graph, a connection between a first ontology node and a first analysis node representing the analysis to be performed; and identifying, within the knowledge graph, a connection between the first source node and the first ontology node; determining the access strategy comprises selecting, from the knowledge graph, a connection between the first source node and the second data node representing a path for transferring data between the first source node and the second data node; the first data node is different from the second data node, and determining the access strategy comprises selecting, from the knowledge graph, a connection between the first data node and the second data node representing a path for transferring the data element between the first data node and the second data node; the first data node is the same as the second data node; identifying, within the knowledge graph, the first data node representing the computational resource on which the analysis is to run comprises: evaluating a plurality of data nodes using a cost function; and selecting, from the plurality of data nodes, the first data node based on the evaluation of the plurality of data nodes; identifying, within the knowledge graph, a third data node representing a computational resource on which a backup of the data element is to reside, the method comprising: determining a synchronization strategy between the second data node and the third data node; the source of the data element comprises one of a sensor, a file, or a database; the synchronization strategy defines a frequency of data synchronization between the first data node and the second data node; the synchronization strategy defines a direction of data transfer between the first data node and the second data node; determining the synchronization strategy based on a type of data of the data element; determining the synchronization strategy based on a type of the analysis; a connection between two data nodes represents a data transfer path between computational resources represented by the two data nodes; a connection between a source node and a data node represents a data transfer path between the source represented by the source node and the computational resource represented by the data node.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, the drawings, and the claims.

DESCRIPTION OF DRAWINGS

Like reference symbols in the various drawings indicate like elements.

DETAILED DESCRIPTION

Figure 1:
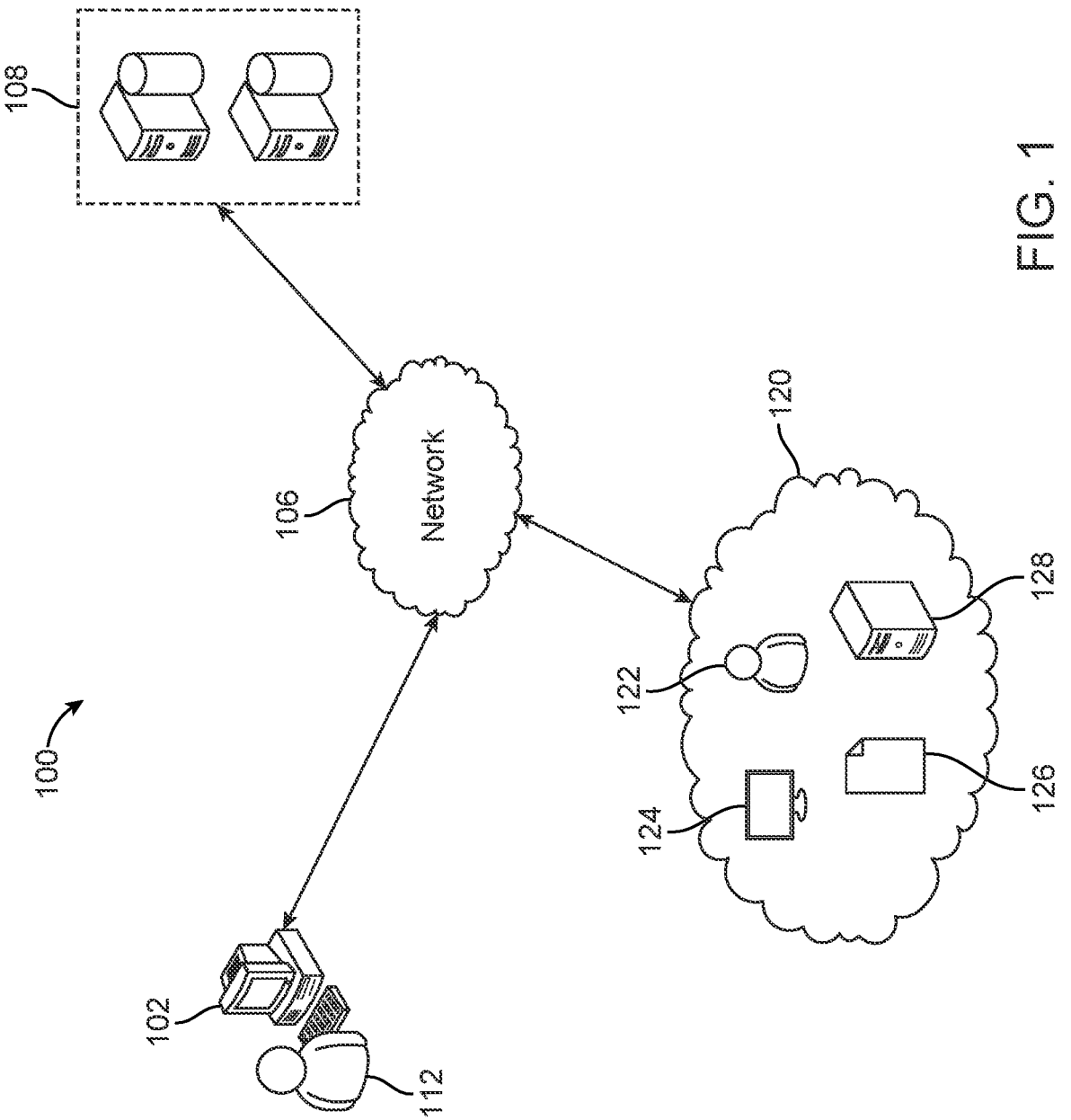
FIG. 1 depicts an example architecture that can be used to execute implementations of the present disclosure.

Implementations of the present disclosure are directed to systems and methods for ontology driven data synchronization mechanism. The systems are oriented on identification of data synchronization mechanisms in a distributed data mesh. A classical data mesh can include multiple data nodes that pass data between them, in different methods of communication, using external orchestrators. The disclosed systems calculate and implement assignments regarding the data that passes between data nodes, and the synchronization method used to pass the data between such data nodes automatically. In particular, the proposed system determines which data elements are to be synchronized between different data nodes, and the method of synchronization. The method of synchronization can be, for example, pull, push, replica, remote access, or any combination of these. A driving analytics defines the data consumption model, employing a "need to know" mechanism that optimizes the data transfer between data nodes, while ensuring only relevant data is passed over the data mesh topology between several data nodes.

The result is an automatic method for synchronization that enables the following capabilities and uniqueness. Visualization of the data mesh, interacting data nodes, and the type of data and data synchronization are recommended. Data demand and its similarity are automatically identified, highlighting which data should be synchronized (data elements) and where it resides (at which data node). Data synchronization policy is selected (such as pull, push, replica, remote access). Types of data access to data and backup methods to implement are recommended.

The disclosed implementations can result in the following advantages. The disclosed techniques can be implemented to automatically determine data access paths and data synchronization strategies for performing requested analyses. The data access paths include only the connections needed to connect the data elements with the data nodes on which the data elements are to reside and the data nodes on which the analyses are to be performed. The resulting knowledge graph includes only the ontology nodes that are needed to support the analyses. Thus, the knowledge graph is optimized for efficiency. By performing analyses using the selected data access and synchronization strategies, the amount of data imported is limited to the minimal amount of data needed to perform the analyses. Thus, the amount of memory required for storing the imported data is reduced. Additionally, the amount of data communicated between data nodes is reduced, reducing the amount of bandwidth required between the data nodes. Data nodes are selected based on criteria that reduces duplication, such that a minimal number of data nodes are employed for storing and processing data. In some cases, a data element can only access a data mesh through a connection to one data node of the data mesh, and other data nodes synchronize at designated frequencies in order to maintain residing data up to date. Thus, data accuracy and currency are improved. The nature of synchronization between data nodes is determined based on the necessary frequency of synchronization. For example, for data elements that change less frequently, synchronization is performed less frequently, reducing the amount and frequency of data transferred between data sources and data nodes, and between data nodes and other data nodes. Once a data access strategy and synchronization strategy are determined for a set of analyses, the strategies can be implemented repeatedly. Thus, the data access strategy and synchronization strategy does not need to be recalculated. When a change is to be made to the requested analyses, to infrastructure, or to data elements, the data access strategy and synchronization strategy can be automatically adjusted to account for the change. The data access strategy and synchronization strategy can therefore be iteratively adjusted over time, improving update speed, and reducing the processing power used to create and maintain the knowledge graph. The disclosed techniques automatically apply restrictions according to rules and policies related to locations of data elements. Thus, data security is improved.

FIG. 1 depicts an example architecture 100 in accordance with implementations of the present disclosure. In the depicted example, the example architecture 100 includes a client device 102, a network 106, and a server system 108. The server system 108 includes one or more server devices and databases (e.g., processors, memory). In the depicted example, a user 112 interacts with the client device 102.

In some examples, the client device 102 can communicate with the server system 108 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provide such services to any number of client devices (e.g., the client device 102 over the network 106). In accordance with implementations of the present disclosure, and as noted above, the server system 108 can host an agile security platform.

In the example of FIG. 1, an enterprise network 120 is depicted. The enterprise network 120 represents a network implemented by an enterprise to perform its operations. In some examples, the enterprise network 120 represents on-premise systems (e.g., local and/or distributed), cloud-based systems, and/or combinations thereof. In some examples, the enterprise network 120 includes IT systems and OT systems. In general, IT systems include hardware (e.g., computing devices, servers, computers, mobile devices) and software used to store, retrieve, transmit, and/or manipulate data within the enterprise network 120. In general, OT systems include hardware and software used to monitor and detect or cause changes in processes within the enterprise network 120 as well as store, retrieve, transmit, and/or manipulate data. In some examples, the enterprise network 120 includes multiple assets. Example assets include, without limitation, users 122, computing devices 124, electronic documents 126, and servers 128.

Given an analytics instance knowledge graph (AKG) as an input, the system enriches the AKG by adding additional ontological and instance level layers.

Layers include a recommended data usage path by identifying where a certain data that is needed by the analytics exists in the data mesh (at which data nodes). This can include identification of whether the data exists locally with the analytics starting point of the same data node, or within another data node. This concept represents the first data aggregation from any data source (e.g., sensor, file, database) into the analytical processing system.

Layers include a backup data exposing path, examining if additional data elements exist in additional data nodes or data sensors.

Layers include a synchronization strategy based on a nature of analysis. This includes an identification policy of synchronization data between data nodes based on activation type of analysis such as on demand analytics activation, or continuous analytics activation.

Layers include a synchronization policy based on the nature of the data, such as a copy/replica approach for static data that does not change, in order to save redundant transactions of the same information, or on demand and remote copy (at every time the data is needed), in cases where the data fluctuates and changes, or a hybrid one, where the data is fetched only if there is an indication that the data was changes, hence copied again, or used from a local copy, since there is no indication of a change.

Figure 2:
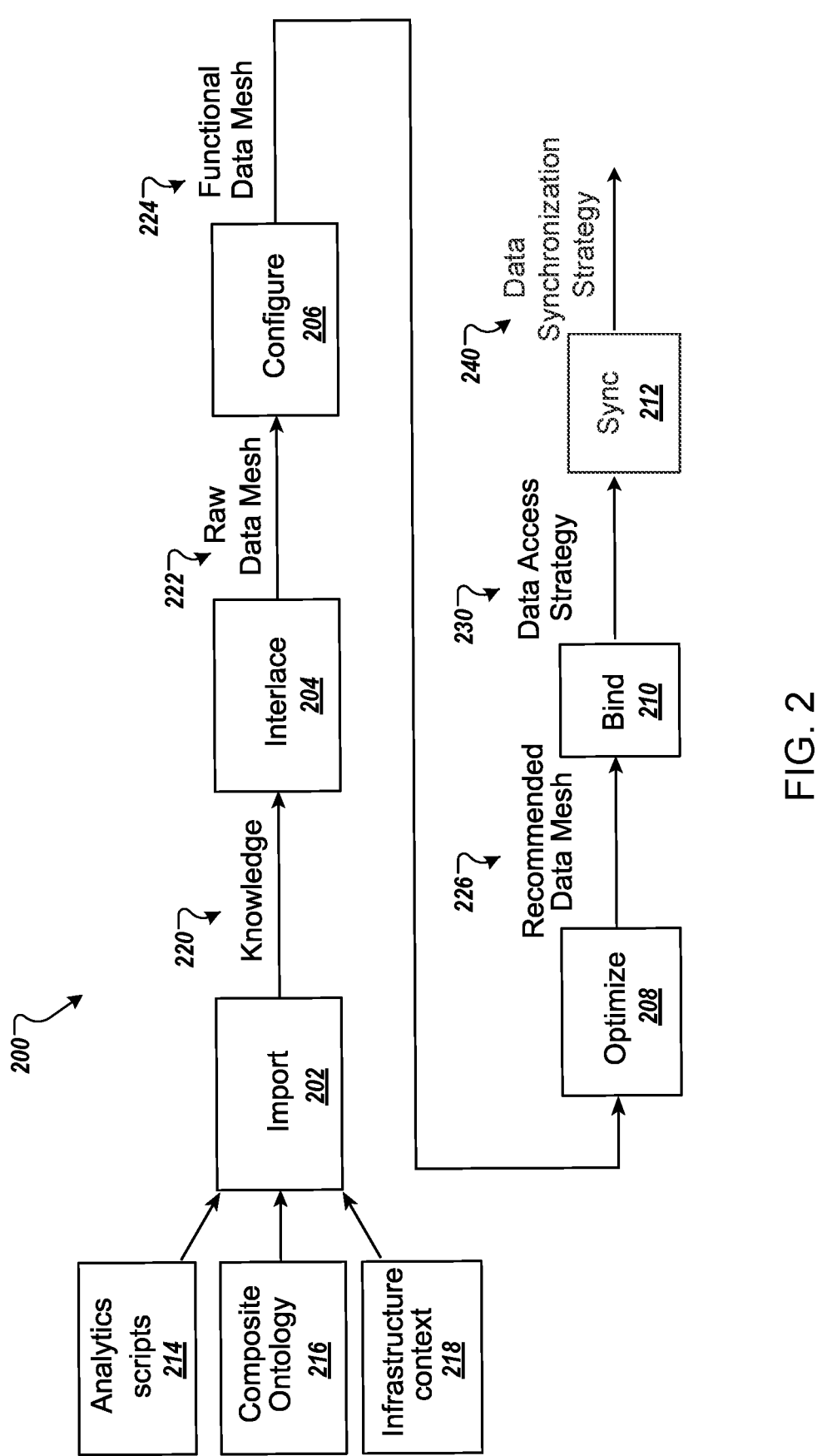
FIG. 2 depicts a flow chart of an example process for access and synchronization strategy selection in accordance with implementations of the present disclosure.

Layers include a resilience strategy to maintain high availability system will produce emergency suite of data exchange pattern which allows mitigation risk of unexpected network break FIG. 2 depicts a flow chart of a process 200 for access and synchronization strategy selection. The process 200 can be performed by a computer system, e.g., the server system 108 of FIG. 1. The synchronization design is derived from an instance of analytics knowledge graph (AKG) that contains information about the available infrastructure, the needed analytics to be executed, data sources (including sensor based data, or existing data nodes, data from third party database, etc.). The analytics knowledge graph (AKG) is an artifact based on graph based queries over graph databases. The AKG stores essential information about the data mesh, including types of data nodes, needed analytics, and ontology (data entity graph model).

In general, based on chosen analytics, available infrastructure and compatible composite ontology, the process 200 is implemented to define which node is expected to run which analysis in an efficient combination. The process 200 is configured to determine a recommended data mesh 226 to support the requested analytics on data nodes. Once the recommended data mesh 226 is defined, each data node can operate independently and autonomously to access the necessary data and execute the analyses.

The process 200 includes six operations orchestrated in linear process. The operations include steps of import 202, interlace 204, configure 206, optimize 208, bind 210, and synchronization 212. An analytics knowledge graph (AKG) is a result of importing and interlacing three knowledge elements. The elements include infrastructure context 218 (e.g., information about default infrastructure settings, available data nodes capabilities). The elements include analytics scripts 214 specifying a desired analysis set (e.g., information about analytics script which should be part of data mesh). The elements include a composite ontology 216 (e.g., a definition of schema, formal naming and definitions of categories, properties, and relation between these concepts).

During the import step 202, information is uploaded about the infrastructure context 218, analytics scripts 214, and composite ontology 216. The result is knowledge 220 represented in a disjoint graph. The disjoint graph includes a set of nodes representing analysis, computational resources, and internally connected domain ontology axioms. A computational resource provides computing power. Axioms are statements that are asserted to be true in the domain being described. The set of nodes includes analysis nodes that each represent an analysis, data nodes that each represent a computational resource, and ontology nodes that each represent an axiom of the data ontology.

The disjoint graph can be a labeled property graph (LPG). An LPG is a type of graph database. In LPG-style databases the graph includes nodes and relationships. Each node or relationship has an ID tag, one or more "labels" describing its type or class, and a set of "properties" that present values and a corresponding key to allow referencing. Nodes can be joined by a connection (also referred to as an edge) representing a relationship between the nodes, to form the larger structure of the graph.

During the interlace step 204, sources of information are connected to create a knowledge graph instance that represents a default, raw state of data mesh (e.g., raw data mesh 222). The knowledge 220 represented by the disjoint graph is used to generate the raw data mesh 222. The raw data mesh 222 is a fully connected graph, with analysis nodes connected to any data nodes that represent computational resources that are available to perform the analysis. A connection between a data node and an analysis node can represent, for example, that the computational resource represented by the data node has sufficient processing power to perform the analysis represented by the analysis node. The configuration of the raw data mesh 222 depended on predefined infrastructure of computational resources.

The interlace step 204 includes connecting analysis nodes with other analysis nodes. This includes recognizing subset relation between analysis nodes and recognizing data tag in pending composite relation. The interlace step 204 includes connecting data nodes with analysis nodes to generate a default setting for all analysis availability on data nodes. The interlace step 204 includes connecting data source nodes with ontology nodes by mapping data schema with ontology schema.

During the configure step 206, rules and constraints can be implemented to reduce the number of data nodes that support the requested analyses. The configuration step 206 is applied to limit the connections of analysis nodes to data nodes within data mesh. Both manual and automated rules for running analytics on data nodes can be implemented.

Configuration 206 can include applying restrictions that may be based on data policies and guidelines. For example, a particular analysis may be required to run locally instead of remotely (e.g., due to data security or sensitivity standards). Thus, connections between the particular analysis and data nodes representing remote computational resources may be removed during configuration 206. Thus, during configuration 206, connections between analysis nodes and data nodes may be removed based on the restrictions. After performing configuration, each analysis node is connected to at least one data node, and can be connected to more than one data node.

The configuration step 206 generates a functional data mesh 224 by applying rules to identify a set of computational resources to support the requested analyses. The functional data mesh 224 is a computation grid which identifies a list of infrastructure elements and identifies computational resources at which analysis can be triggered. The functional data mesh 224 includes, for each analysis node, a direct or indirect connection to at least one data node. The functional data mesh 224 includes a subset of the data nodes of the raw data mesh 222.

During the optimize step 208, data nodes are removed from the functional data mesh 224 to generate a recommended data mesh 226. Optimization 208 includes removing data nodes that are not needed for deployment. The recommended data mesh 226 includes a single instance of the knowledge graph, with analysis nodes assigned to data nodes that are to execute the analysis.

The optimization step 208 validates the functional data mesh 224 for efficiency. All functional permutations of the functional data mesh 224 data mesh are checked from value perspective. As a result, an optimal configuration is returned as the recommended data mesh 226, which represents a minimal environment for running the requested analyses.

The optimization step 208 can optimize the functional data mesh 224 for any optimization function. Based on a recommended computation grid that represents available infrastructure that can support and activate the data nodes, the data distribution (defining which data elements will reside on which data node) is calculated.

The result of optimization step 208 is a recommended data mesh 226. The recommended data mesh 226 can include a selection of a subset of analyses to run over cloud resource, a subset of analyses to run locally, a subset of analyses to run on edge, a subset of analyses to run on frame, or any combination of these. The recommended data mesh 226 can specify, for each analysis, whether the analysis is to be performed locally or remotely.

During the binding step 210, external data sources are bound to the recommended data mesh data mesh. In order for analyses to run, data sources need to feed data to data nodes. A data access strategy identifies data transfer paths between data sources and the data nodes on which the data elements generated by the data sources are to reside. The data access strategy identifies connections between data nodes on which data element reside and data nodes on which analyses are to be performed using the data elements. The binding step 210 determines data access strategies based on chosen analytics, available infrastructure, available data, and compatible composite ontology. The result of the binding step 210 is a data access strategy 230 that defines where and how data sources should be accessed, including an identification, for each data source, which node is to connect the data element to the data mesh. The binding step 210 is described in greater detail with respect to FIGS. 3A-D, 4A-C, and 5.

During the synchronization step 212, data exchange policies is developed. The data exchange policies are selected according to analytics activation policy and the nature of the data. In some examples, the same data element can reside on multiple data nodes, can be processed by multiple data nodes, or both. Thus, duplicate data elements can exist in a data mesh. The duplicate data elements, or copies, should be maintained up to date and consistent with each other. A synchronization policy defines synchronization frequencies and synchronization types for updating data elements on data nodes. The result of the synchronization step 212 is a synchronization strategy 240 that defines the optimal data exchange strategy, including the set of data that is to be exchanged, and the nature of exchange. The synchronization step 212 is described in greater detail with respect to FIGS. 3A-D, 4A-C, and 5.

Figures 3A, 3B, 3C, 3D:
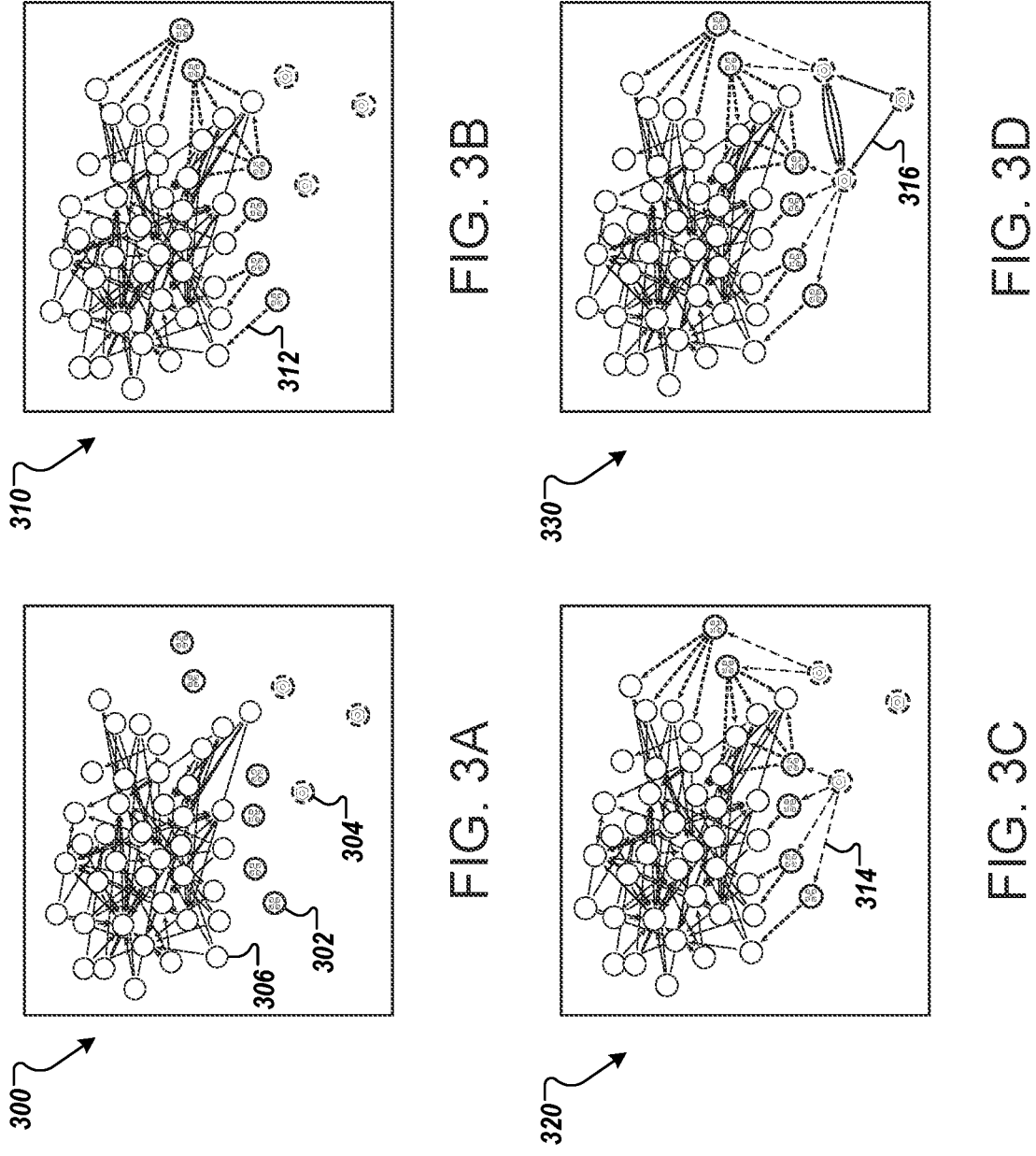
FIGS. 3A, 3B, 3C, and 3D depict example steps of developing a binding and synchronization strategy for connecting source nodes, ontology nodes, and data nodes.

FIGS. 3A, 3B, 3C, and 3D depict example steps of developing a binding and synchronization strategy for connecting source nodes, ontology nodes, and data nodes. Referring to FIG. 3A, the knowledge graph has an initial state 300. The initial state represents disjoint knowledge instances of data sources, represented by source nodes computing resources represented by data nodes, and ontology axioms represented by ontology nodes. In FIGS. 3A, 3B, 3C, and 3D, source nodes are labeled with a database icon (e.g., source node 302), data nodes are labeled with a gear icon (e.g., data node 304), and ontology nodes are represented by circles with no label (e.g., ontology node 306). The initial state represented by the knowledge graph depends on predefined infrastructure.

Referring to FIG. 3B, a recommended data mesh 310 includes a mapping of a data layer to an ontology layer. Data sources, represented by source nodes, are connected to ontology axioms, represented by ontology nodes. The connections between source nodes and ontology nodes are represented in FIG. 3B by short-dashed arrows (e.g., connection 312). To map the data schema to the ontology schema, the nature and type of data source is identified. The type of data source can be, for example, a sensor device or a data storage device.

Referring to FIG. 3C, knowledge graph 320 includes an access strategy developed by binding the data layer with a data node layer. Data sources, represented by source nodes, are connected to computing resources, represented by data nodes. The connections between source nodes and data nodes are represented in FIG. 3C by long-dashed arrows (e.g., connection 314). Each connection represents a primary access data transfer path from the data mesh to the data source of a data element. To map the data layer to the data node layer, the nature and set of data needed to perform the requested analyses are identified. The data access strategy identifies a recommended access policy in optimal context, based on value, demand, configuration, and data nature.

Referring to FIG. 3D, knowledge graph 330 includes a data synchronization strategy developed by forming connections between data nodes of the data node layer. Computing resources, represented by data nodes, are connected to each other. The connections between data nodes are represented in FIG. 3D by thick solid arrows (e.g., connection 316). Each connection represents a nature, direction, and set of data to be synchronized between data nodes. The knowledge graph 330 thus includes both a data access strategy and a data synchronization strategy.

Figure 4A:
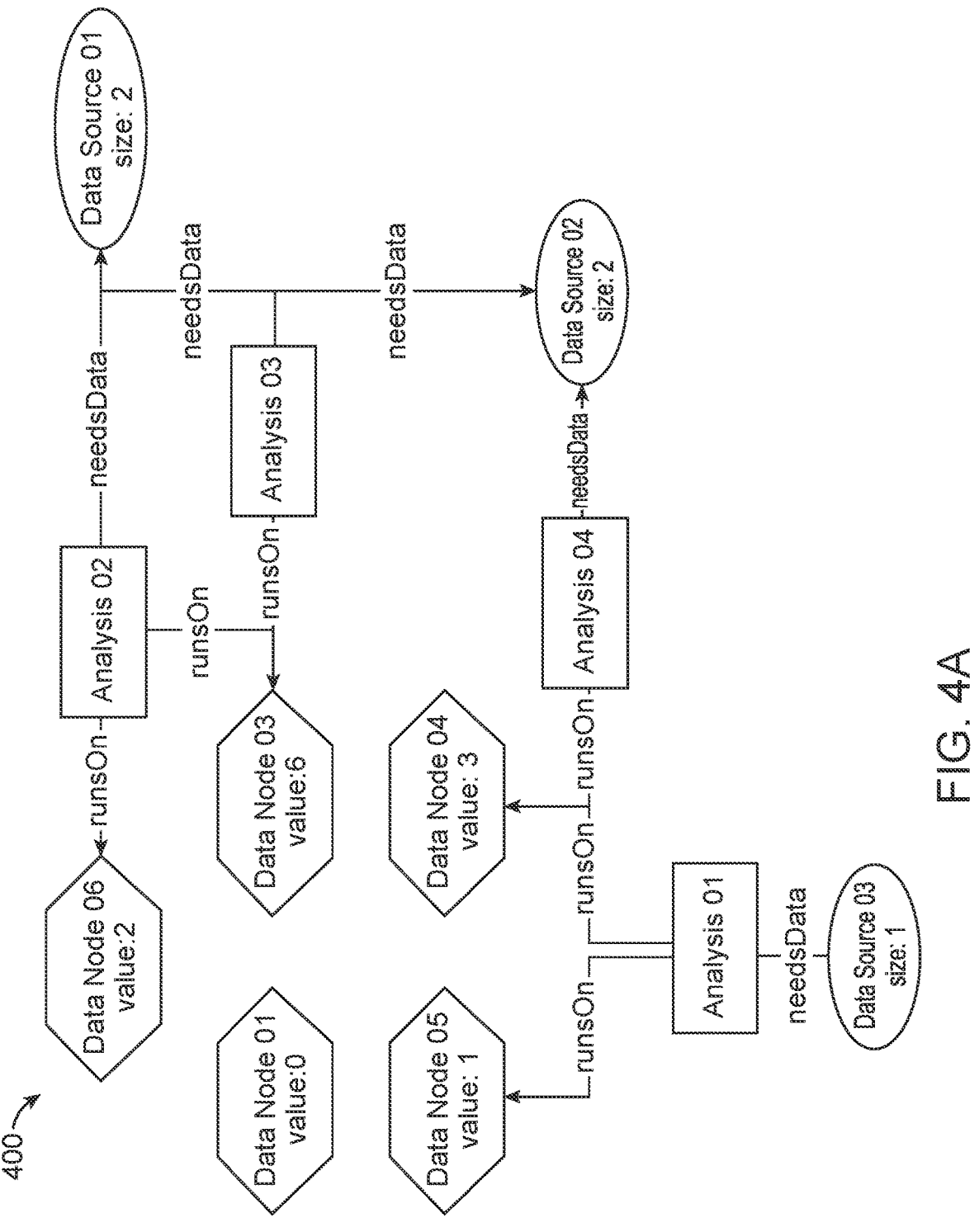
FIG. 4A depicts an example subgraph of a knowledge graph with connections between data sources, data nodes, and analysis nodes.

FIG. 4A depicts an example subgraph 400 of a knowledge graph with connections between source nodes, data nodes, and analysis nodes. A knowledge graph can include runsOn relations, such as the runsOn relation between Analysis 03 and Data Node 03 in the subgraph 400. The runsOn relation between Analysis 03 and Data Node 03 represents that the analysis represented by Analysis 03 can run on the computing resource represented by Data Node 03.

A knowledge graph can include needsData relations, such as the needsData relation between Analysis 03 and Data Source 02. The needsData relation between Analysis 03 and Data Source 02 represents that a data element from Data Source 02 is needed to perform the analysis represented by Analysis 03.

The subgraph 400 represents part of a recommended data mesh including a computation grid which maintains stability of running analysis and applies a value-oriented function (e.g., minimizing cost of infrastructure, minimize data exchange necessity). The cost value associated with a data node represents the size of a data element set needed locally to prevent remote sourcing of data. In subgraph 400, Data Node 03 has a value of six, due to the connections between Data Node 03 and Data Sources 01, 02, and 03, which each have a size of two. Data Node 04 has a value of three, due to the connections between Data Node 04 and Data Source 02, having a size of two, and Data Source 03, having a size of one.

The subgraph 400 includes analysis nodes Analysis 01, Analysis 02, Analysis 03, Analysis 04. All of the analysis nodes are connected to either Date Node 03 or Data Node 04 with a runsOn relation. Therefore, the recommended data mesh topology identifies Data Nodes 03 and 04 as optimal, meaning that Data Nodes 03 and 04 allow triggering all analyses with minimal cost.

Once data sources and needed data synchronizations are mapped in the knowledge graph, the system can determine and assign a main location of the data element (e.g., the data node on which a data element is to reside). For example, Data Source 02 can be assigned to either Data Node 03 or Data Node 04. The backup of Data Source 02 can be assigned to the other of the two nodes. The assignment indicates which Data Node holds the record of retention, and which Data Node needs to synchronize and adjust. For example, a data element from Data Source 02 can be assigned to reside on Data Node 03, and the backup of the data element can be assigned to reside on Date Node 04. In developing a data access strategy, Data Node 03 can be assigned a hasAccess relation with Data Source 02, so that data elements generated by Data Source 02 are accessible by Data Node 03. In developing a data synchronization strategy, Data Node 04 can be synchronized with Data Node 03, so that changes to the data element from Data Source 02, residing on Data Node 03, are also kept up to date on Data Node 04. Synchronization can be performed to make updates for new versions of the data source, to store backup, and to track changes.

Information about data needed for analyses can be determined from the AKG. The analysis layer includes relations for required data elements from the ontology and semantic layer. As a result of the data access algorithm, the AKG is enriched by relations indicating recommended connections and lists of backup connections. For example, connections can be made between sources that generate data elements and data nodes on which the data elements are to reside, and between the data nodes on which the data elements are to reside and the data nodes on which the data elements are to be backed up. The data access assignment can thus define access permissions for certain data nodes to access other data nodes.

Based on connections between data sources and analytics that require the data locally, a source node can be selected from among multiple source nodes. For example, a source node can be selected due to having a high availability or the lowest cost of storing data. In some examples, a source node can be selected based on geographical distance or distance through the knowledge graph. The distance can be represented, for example, by how many steps are between the source node of a data element and the data node on which the analytics is to be run on the data element. In some examples, the location of the data can be controlled by a compliance policy, in which there is a limitation to keep a record on a specific data node, or prohibit the usage of a particular data element in another data node (such as the case of privacy). As a result, the location and synchronization type can be selected based on the system recommendation. In some examples, the order of data access between cascading data nodes can be sorted automatically based on frequency of usage of a specific data element by a list of analytics.

As a part of data access strategy step, the AKG is enriched by a recommendation of primary access from data source to data mesh, where the data mesh includes data nodes and analysis nodes. In addition, the synchronization framework enables determination of an emergency restore strategy in the event that the primary connection is interrupted and data flow into data mesh stopped. For example, a data element from Data Source 02 can be assigned to primarily reside on Data Node 03. A path between Data Source 02 and Data Node 03 may be interrupted. In response to the interruption, a data access connection can be selected between Data Source 02 and Data Node 04, so that the data element can still be imported to the data mesh. Dynamically, a second suite of configuration can be released, including a substitution of data source access connections and corresponding data synchronization paths, including a recalculated method and set of data elements to be exchanged.

Figure 4B:
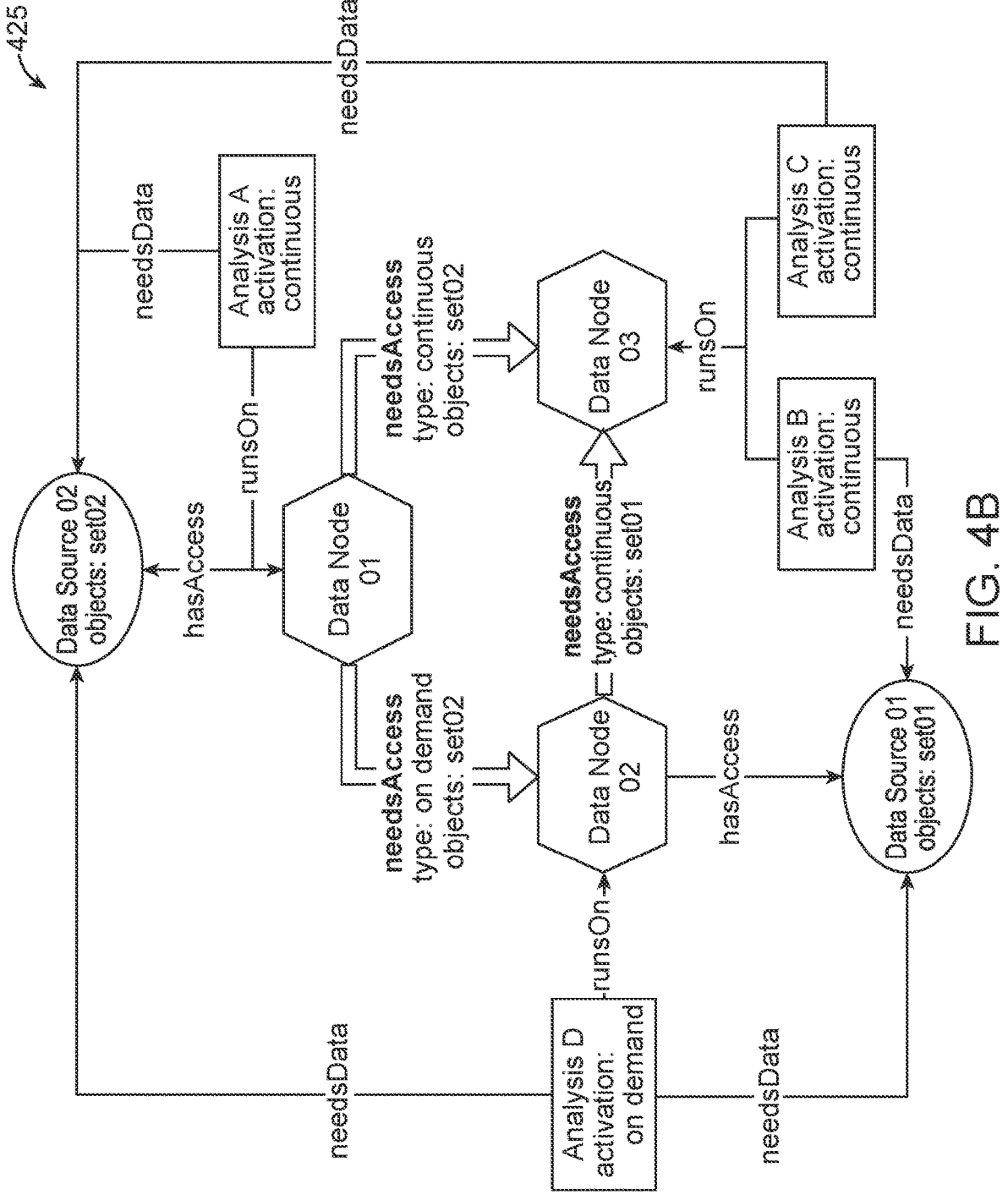
FIG. 4B depicts a data synchronization subgraph in accordance with implementations of the present disclosure.

FIG. 4B depicts a data synchronization subgraph 425. Ontology elements can be added to the knowledge graph to capture the data synchronization perspective. A data synchronization strategy identifies a data exchange policy that defines the set of data to be synchronized and the nature of synchronization. The data synchronization strategy can be determined by identifying the data nodes of a data mesh that need access to certain data sources in order to run the requested analyses, and determining synchronization paths between the data nodes and the access point between the data source and the data mesh.

An analysis vertex, such as Analysis D of subgraph 425, represents analytics and holds various attributes. Attributes include code, such as analytics script in string format. Attributes include a data tag. Each analytics is validated against predefined rules to identify its main scope, such as telemetry, personal data oriented. Attributes include activation, such as the nature of running analysis, which could be on demand or continual.

A data node vertex, such as Data Node 01 of subgraph 425, represents the infrastructure dimension and holds information about value. Value can be defined as a measure of algorithm focus, computation power, cost, size, availability. The data node vertex holds information about a type and location of a computing resource, such as a size of the computing resource and a server localization.

A data source vertex, such as Data Source 02, represents the data source dimension. The data source vertex holds information about objects and data, such as information about data stored in the source. The data source vertex holds information about a data tag. Each analysis has a definition of the nature of data. The nature of the data can include slowly changing dimension, rapidly changing dimension, and stream (e.g., IoT data).

A subgraph, e.g., subgraph 425, can include association types such as hasAccess and needsAccess. A hasAccess edge represents a relation between a data node and a source of data. The location of such relations is unique and single for a data source, and is a representation of primary access of a source of data to the data mesh. Therefore, in some examples, each data source connects to the data mesh with a hasAccess relation to only one data node of the data mesh. In the subgraph 425, the association hasAccess between Data Source 02 and Data Node 01 represents that the computing resource Data Node 01 has access to the data element generated by Data Source 02.

The needsAccess edge represents needed connection between data nodes to exchange data. The needsAccess edge defines the direction of demand and stores two properties, including a type (defined as nature of synchronize data: copy, on demand, continues) and objects (set of data objects which need to be synchronized). In the subgraph 425, the association needsAccess between Data Node 01 and Data Node 02 represents that the computing resource represented by Data Node 02 needs access to the data object set 02 that resides on Data Node 01.

In subgraph 425, Analysis D has a needsData relation with Data Source 02 and with Data Source 01. Analysis D has a runsOn relation with Data Node 02. Data Node 02 has a hasAccess relation with Data Source 01 but does not have a hasAccess relation with Data Source 02. Instead, Data Source 02 has a hasAccess relation with Data Node 01. Therefore, Data Node 02 has a needsAccess relation with Data Node 01 in order to run Analysis D on Data Node 02. The nature of the synchronization is on demand because Analysis D is activated on demand.

The definition of a synchronization policy depends on multiple factors. A first factor is recommended data mesh, including the grid topology of data nodes which are optimized from value perspective (e.g., exalt associations between data elements or reduce cost of deployment). An example can be a data node that contains information about a vehicle and its passenger, and another data node that contains information about people payments and salary (of the same people). According to the data structures, there can be analytics relating to driving, and analytics that relates to salary. Ontological clustering can be performed, with optimization based on analytics activation. A second factor is a data access policy, including information about a primary connection from a data source to the first interacting data nodes, and between data nodes according to analytics requirements of remote data elements.

A synchronization strategy can indicate a method of synchronization between two or more data elements within separate data nodes. A synchronization method can be, for example copy/replica, on demand, or continuous. As a result, the AKG is enhanced with inferred relations between data nodes.

Based on data frequency update type, (static or dynamic, common location of use, number of requests for the data by local analytics versus remote analytics) a synchronization method, or strategy, can be assigned. A synchronization strategy can be, for example, copy/replica or constant synchronization Based on the update frequency of the analytics, a sub method of constant synchronization can be assigned. For example, constant synchronization can include on-demand or continuous synchronization.

In some examples, the synchronization strategy can be determined based on a frequency of data demand, rapid availability of the data, or both. In some examples, subsets of data entities can be identified that need constant replication. A list of comparison can be generated between available data entities, and potential locations on relevant data nodes, as well as the demands on such data objects.

The synchronization strategy can include a direction of synchronization. The direction of synchronization can be determined based on availability of the data, which is an artifact from the data access strategy implementation. The direction of synchronization can be, for example, a push/pull association between data nodes.

The synchronization strategy can be determined based on the location of data or a specific data node. The strategy can include a query based system, which can be implemented when there are less frequent changes to the data, with higher repeating analytics. The strategy can include a storage based system, which can be implemented when there are more frequent changes to data, with lower numbers of repeating analytics.

The enrichment of the optimization knowledge graphs adds an inference association and termed needs. Enrichment can also add access that represents the path of sharing data (by copy or by remote access) and link the source data node where data is originally gained or computed, to a destination (analytics that consumes the data entity yet resides on a different data node from the source data node).

Figure 4C:
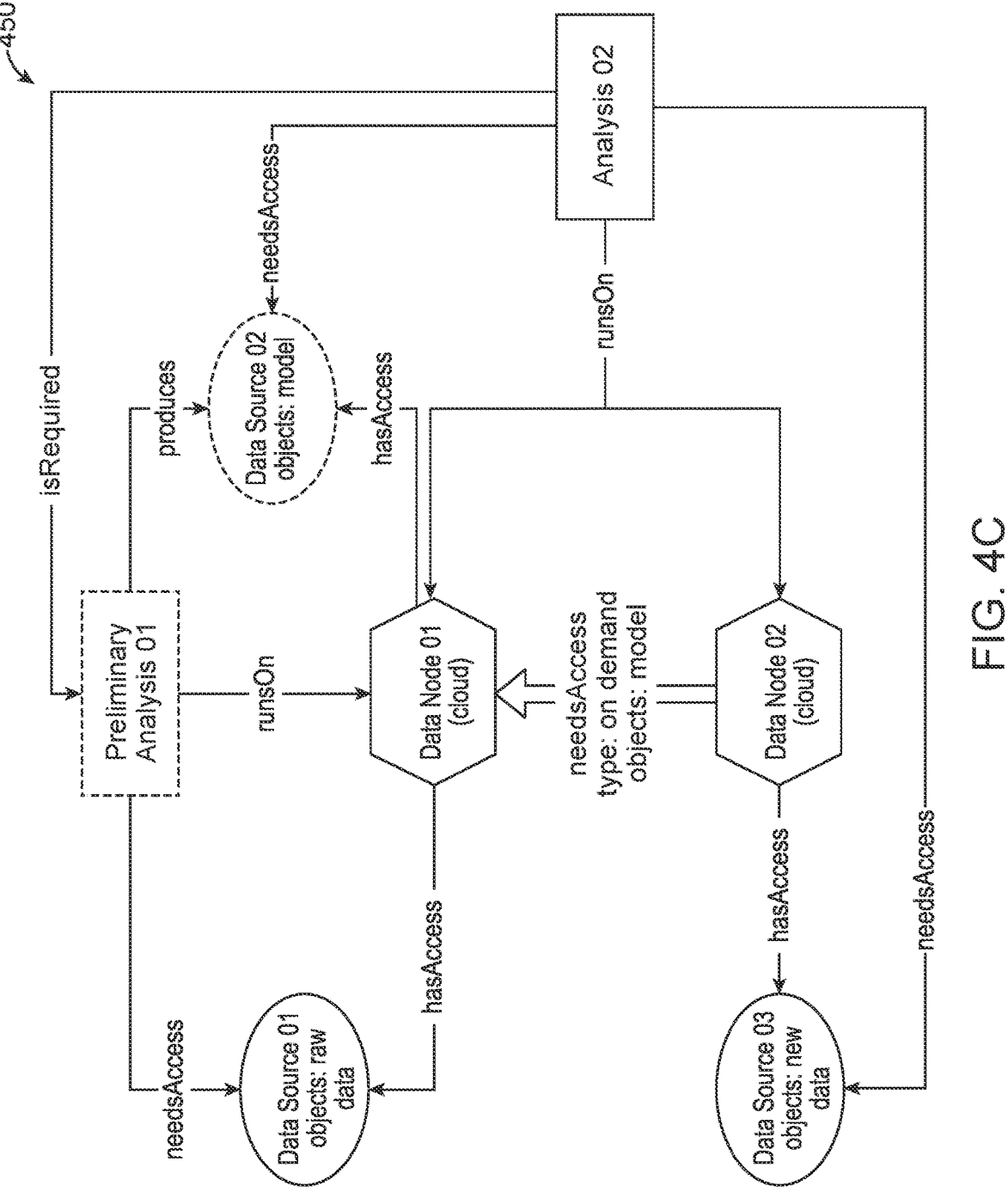
FIG. 4C depicts a machine learning flow subgraph in accordance with implementations of the present disclosure.

FIG. 4C depicts a machine learning flow subgraph 450. To develop a data access strategy and data synchronization strategy using a machine learning approach, the knowledge graph can be enriched by various factors in order to enable accessing raw data, training the machine learning model, deploying the machine learning model, accessing new data, and consuming the machine learning model.

A knowledge graph for machine learning can include Preliminary Analysis nodes, such as Preliminary Analysis 01 in the subgraph 450. A Preliminary Analysis node represents an analysis that is a prerequisite to default analytics. A preliminary analysis can include, for example, deep learning for image recognition or training of a regression model for future metric prediction.

A knowledge graph for machine learning can include isRequired relations, such as the isRequired relation between Analysis 02 and Preliminary Analysis 01 in the subgraph 450. The relation isRequired represents a precondition for triggering default analysis. For example, a precondition can be training a model that is to be consumed on other data nodes.

A knowledge graph for machine learning can include Produces relations, such as the Produces relation between Preliminary Analysis 01 and Data Source 02 in the subgraph 450. A Produces relation captures a scenario when, after running the analysis, a new object is produced. The new object can be a machine learning model, such as the model represented by Data Source 02. The new object can be consumed on other data nodes.

A knowledge graph for machine learning can include configuration rules for raw data that is used for model training. In some cases, access to raw data is limited to data nodes that can perform heavy computation (e.g., cloud units, graphics processing unit).

Figure 5:
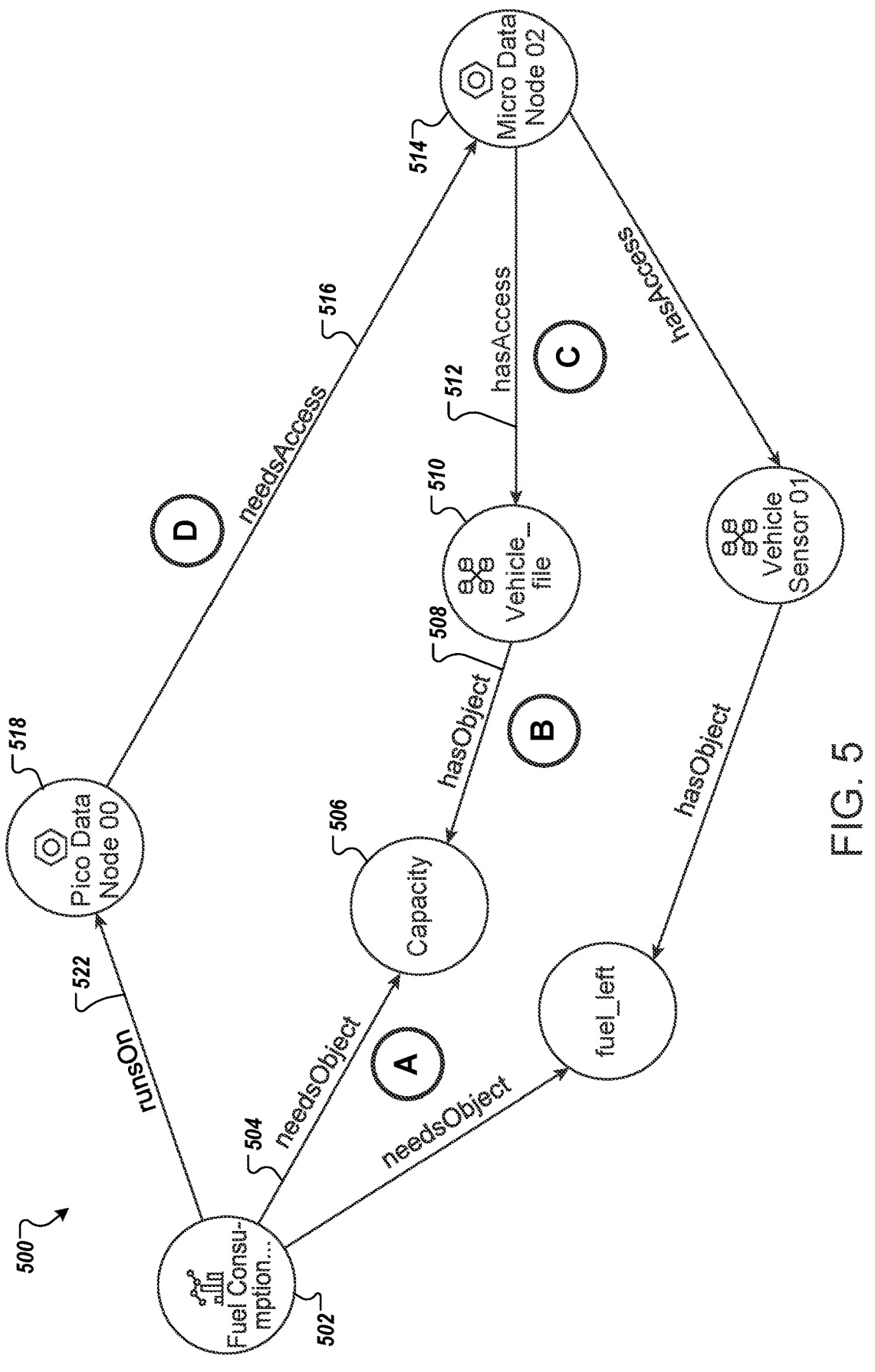
FIG. 5 depicts an example portion of a knowledge graph with connections between data sources, data nodes, ontology nodes, and analysis nodes.

FIG. 5 depicts an example portion of a knowledge graph 500 with connections between data sources, data nodes, ontology nodes, and analysis nodes. The knowledge graph 500 shows an analysis represented by analysis node 502 that runs on a computing resource represented by data node 518. The analysis node 502 therefore has a connection 522 with the data node 518. The connection 522 is a runsOn relation. A path between the analysis node 502 and a data object needed to perform the analysis represented by analysis node 502 is determined in four steps shown as (A) through (D).

In step (A), a connection 504 is created between an analysis node 502 and an ontology node 506. The connection 504 is a needsObject relation, indicating that the analysis represented by the analysis node 502 needs the axiom represented by the ontology node 506. The connection 504 is created based on recognizing minimal axioms needed to run the analysis represented by analysis node 502.

In step (B), a connection 508 is created between ontology node 506 and source node 510. The connection 508 is a hasObject relation, indicating that the data source represented by the source node 510 has the data object needed by the ontology node 506 for the analysis represented by the analysis node 502. The connection 508 is created based on recognizing available data objects and their sources.

In step (C) a connection 512 is created between source node 510 and data node 514. The connection 512 has a hasAccess relation, indicating that the computing resource represented by the data node 514 has access to the data source represented by the source node 510. The connection 512 can be created during a binding step (e.g., binding step 210), in which a data access strategy is determined between data sources and data nodes of the data mesh.

In step (D), a connection 516 is created between the data node 514 and data node 518. The connection 516 has a needsAccess relation, indicating that the computing resource represented by data node 518 needs access to the data residing on the computing resource represented by data node 514. The computing resource represented by data node 518 needs access to the data residing on the computing resource represented by data node 514 because the analysis represented by analysis node 502 runs on the computing resource represented by data node 518, but data node 518 does not have access to the source node 510. The connection 516 can be created during a synchronization step (e.g., synchronization step 212). A synchronization strategy can be determined to synchronize the data node 518 with the data node 514 so that the analysis represented by analysis node 502 can be performed with accurate and current information from the source node 510.

Figure 6:
FIG. 6 depicts a flow diagram of an example process for data synchronization in accordance with implementations of the present disclosure.
Figure 6:
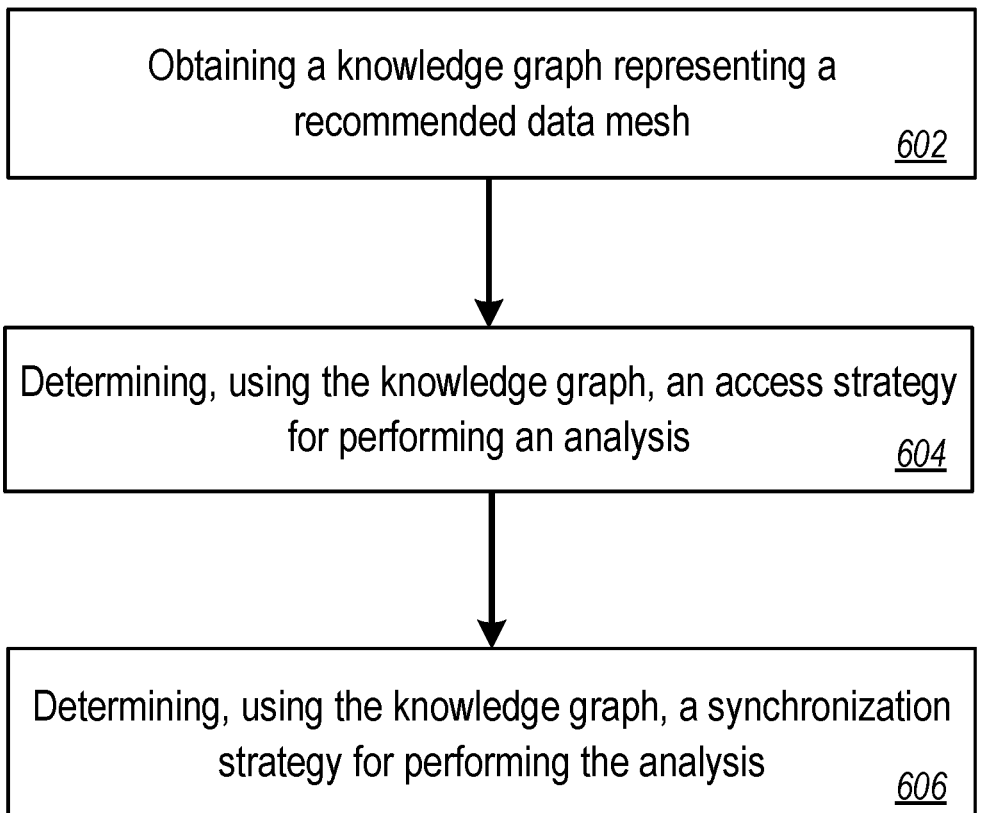

FIG. 6 depicts a flow diagram of an example process 600 for data synchronization in accordance with implementations of the present disclosure.

The process 600 includes obtaining a knowledge graph representing a recommended data mesh (602). The knowledge graph can be provided as a computer-readable data structure. The knowledge graph includes nodes and connections between the nodes. The nodes include data nodes, with each data node representing a computational resource. The nodes include analysis nodes, with each analysis node representing an analysis to be performed. The nodes include source nodes, with each source node representing a source of a data element. The source of the data element can be, for example, a sensor, a file, a database, or any combination of these. The nodes include ontology nodes, with each ontology node representing an axiom of a data ontology. A connection between two data nodes represents a data transfer path between the computational resources represented by the two data nodes. A connection between a source node and a data node represents a data transfer path between the source represented by the source node and the computational resource represented by the data node.

The process 600 includes determining, using the knowledge graph, an access strategy for performing an analysis (604). A first source node representing a source of a data element is identified within the knowledge graph. The first source node represents a source of a data element on which the analysis is to be performed. In some examples, the first source node is one of multiple data nodes that can be selected to provide the data element. The first source node can be selected based on selection criteria. The selection criteria can include, for example, a distance between the source node and the analysis node that is to perform the analysis on the data element. The first source node can be identified by identifying a connection between a first ontology node and a first analysis node representing the analysis to be performed, and by identifying a connection between the first source node and the first ontology node.

A first data node representing a computational resource is identified within the knowledge graph. The first data node represents a computational resource that the analysis will run on. The first data node can be identified by identifying, within the knowledge graph, a connection between the first data node and a first analysis node representing the analysis to be performed. The first data node can be identified by evaluating multiple data nodes using a cost function, and selecting the first data node based on the evaluation of the multiple data nodes.

A second data node representing a computational resource is identified within the knowledge graph. The second data node represents a computational resource on which the data element is to reside. In some examples, the first data node is different from the second data node. In some examples, the first data node is the same as the second data node.

The access strategy is determined between the first source node and the second data node. The access strategy can define how the second data node accesses the data element from the source node, such that the data element resides on the second data node. The access strategy can be determined by selecting or establishing a connection between the first source node and the second data node. The selected connection represents a path for transferring data between the first source node and the second data node.

The access strategy can define how the first data node accesses the data element that is residing on the second data node, in order for the analysis to be performed on the data element and to run on the first data node. The access strategy can be determined by selecting or establishing a connection between the first data node and the second data node. The selected connection represents a path for transferring data between the first data node and the second data node.

The process 600 includes determining, using the knowledge graph, a synchronization strategy for performing the analysis (606). The synchronization strategy is determined between the first data node and the second data node. The synchronization strategy can define a frequency of data synchronization between the first data node and the second data node. The synchronization strategy can define a direction of data transfer between the first data node and the second data node. The synchronization strategy can be determined based on a type of data of the data element, based on a type of the analysis, or both.

In some examples, a third data node is identified. The third data node represents a computational resource on which a backup of the data element is to reside. A synchronization strategy can be determined between the second data node and the third data node.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed.

What is claimed is:

1. A computer-implemented method executed by one or more processors and comprising:

importing knowledge elements, the knowledge elements include an infrastructure context, analytics scripts, and a composite ontology, uploading information about the infrastructure context, the analytics scripts, and the composite ontology resulting in knowledge, wherein the knowledge is represented in a knowledge graph having an initial state representing disjoint knowledge instances of data sources, and wherein the knowledge graph includes a set of nodes, the set of nodes including:

analysis nodes, each analysis node representing an analysis, data nodes, each data node representing a computational resource, and ontology nodes, each ontology node representing an axiom of a data ontology;

connecting, in an interlace step, sources of information to create a knowledge graph instance of the knowledge graph, wherein the knowledge graph instance represents a raw data mesh, wherein the raw data mesh is a fully connected graph, with the analysis nodes connected to any data nodes that represent computational resources that are available to perform the analysis,

wherein the interlace step includes connecting the analysis nodes with other analysis nodes, wherein the interlace step includes connecting the data nodes with the analysis nodes to generate a default setting for all analysis availability on the data nodes, and wherein the interlace step includes connecting the data nodes with the ontology nodes by mapping a data schema to an ontology schema;

applying rules and constraints to limit the connections of the analysis nodes to the data nodes, generating a functional data mesh by applying the rules to identify a set of computational resources to support the analysis, and wherein the functional data mesh includes, for each analysis node, a direct or indirect connection to at least one data node;

optimizing the functional data mesh to generate a recommended data mesh, wherein optimizing the functional data mesh includes removing the data nodes that are not needed for deploying the recommended data mesh;

obtaining an updated knowledge graph representing the recommended data mesh, the updated knowledge graph comprising a computer-readable data structure and including nodes and connections between the nodes: and determining, using the updated knowledge graph, an access strategy and a synchronization strategy for performing an analysis, by, automatically:

identifying, within the updated knowledge graph, a first source node representing a source of a data element on which the analysis is to be performed, identifying, within the updated knowledge graph, a first data node representing a computational resource on which the analysis is to run, identifying, within the updated knowledge graph, a second data node representing a computational resource on which the data element is to reside, determining the access strategy between the first source node and the second data node, and determining the synchronization strategy between the first data node and the second data node.

2. The method of claim 1, wherein identifying the first data node representing the computational resource on which the analysis is to run comprises identifying, within the updated knowledge graph, a connection between the first data node and a first analysis node representing the analysis to be performed.

3. The method of claim 1, wherein the nodes include ontology nodes, each ontology node representing the axiom of the data ontology, wherein identifying, within the updated knowledge graph, the first source node representing the source of the data element on which the analysis is to be performed comprises:

identifying, within the updated knowledge graph, a connection between a first ontology node and a first analysis node representing the analysis to be performed; and identifying, within the updated knowledge graph, a connection between the first source node and the first ontology node.

4. The method of claim 1, wherein determining the access strategy comprises selecting, from the updated knowledge graph, a connection between the first source node and the second data node representing a path for transferring data between the first source node and the second data node.

5. The method of claim 1, wherein the first data node is different from the second data node, and determining the access strategy comprises selecting, from the updated knowledge graph, a connection between the first data node and the second data node representing a path for transferring the data element between the first data node and the second data node.

6. The method of claim 1, wherein the first data node is the same as the second data node.

7. The method of claim 1, wherein identifying, within the updated knowledge graph, the first data node representing the computational resource on which the analysis is to run comprises:

evaluating a plurality of data nodes using a cost function; and selecting, from the plurality of data nodes, the first data node based on the evaluation of the plurality of data nodes.

8. The method of claim 1, comprising:

identifying, within the updated knowledge graph, a third data node representing a computational resource on which a backup of the data element is to reside, the method comprising:

determining a synchronization strategy between the second data node and the third data node.

9. The method of claim 1, wherein the source of the data element comprises one of a sensor, a file, or a database.

10. The method of claim 1, wherein the synchronization strategy defines a frequency of data synchronization between the first data node and the second data node.

11. The method of claim 1, wherein the synchronization strategy defines a direction of data transfer between the first data node and the second data node.

12. The method of claim 1, comprising determining the synchronization strategy based on a type of data of the data element.

13. The method of claim 1, comprising determining the synchronization strategy based on a type of the analysis.

14. The method of claim 1, wherein a connection between two data nodes represents a data transfer path between computational resources represented by the two data nodes.

15. The method of claim 1, wherein a connection between a source node and a data node represents a data transfer path between the source represented by the source node and the computational resource represented by the data node.

16. A non-transitory computer-readable storage medium coupled to one or more processors and having instructions stored thereon which, when executed by the one or more processors, cause the one or more processors to perform operations comprising:

importing knowledge elements, the knowledge elements include an infrastructure context, analytics scripts, and a composite ontology, uploading information about the infrastructure context, the analytics scripts, and the composite ontology resulting in knowledge, wherein the knowledge is represented in a knowledge graph having an initial state representing disjoint knowledge instances of data sources, and wherein the knowledge graph includes a set of nodes, the set of nodes including:

analysis nodes, each analysis node representing an analysis, data nodes, each data node representing a computational resource, and ontology nodes, each ontology node representing an axiom of a data ontology;

connecting, in an interlace step, sources of information to create a knowledge graph instance of the knowledge graph, wherein the knowledge graph instance represents a raw data mesh, wherein the raw data mesh is a fully connected graph, with the analysis nodes connected to any data nodes that represent computational resources that are available to perform the analysis, wherein the interlace step includes connecting the analysis nodes with other analysis nodes, wherein the interlace step includes connecting the data nodes with the analysis nodes to generate a default setting for all analysis availability on the data nodes, and wherein the interlace step includes connecting the data nodes with the ontology nodes by mapping a data schema to an ontology schema;

applying rules and constraints to limit the connections of the analysis nodes to the data nodes, generating a functional data mesh by applying the rules to identify a set of computational resources to support the analysis, and wherein the functional data mesh includes, for each analysis node, a direct or indirect connection to at least one data node;

optimizing the functional data mesh to generate a recommended data mesh, wherein optimizing the functional data mesh includes removing the data nodes that are not needed for deploying the recommended data mesh;

obtaining an updated knowledge graph representing the recommended data mesh, the updated knowledge graph comprising a computer-readable data structure and including nodes and connections between the nodes and determining, using the updated knowledge graph, an access strategy and a synchronization strategy for performing an analysis, by, automatically:

identifying, within the updated knowledge graph, a first source node representing a source of a data element on which the analysis is to be performed, identifying, within the updated knowledge graph, a first data node representing a computational resource on which the analysis is to run, identifying, within the updated knowledge graph, a second data node representing a computational resource on which the data element is to reside, determining the access strategy between the first source node and the second data node, and determining the synchronization strategy between the first data node and the second data node.

17. The non-transitory computer-readable storage medium of claim 16, wherein identifying the first data node representing the computational resource on which the analysis is to run comprises identifying, within the updated knowledge graph, a connection between the first data node and a first analysis node representing the analysis to be performed.

18. The non-transitory computer-readable storage medium of claim 16, wherein the updated knowledge graph includes ontology nodes, each ontology node representing an axiom of a data ontology, wherein identifying, within the updated knowledge graph, the first source node representing the source of the data element on which the analysis is to be performed comprises:

identifying, within the updated knowledge graph, a connection between a first ontology node and a first analysis node representing the analysis to be performed; and identifying, within the updated knowledge graph, a connection between the first source node and the first ontology node.

19. The non-transitory computer-readable storage medium of claim 16, wherein determining the access strategy comprises selecting, from the updated knowledge graph, a connection between the first source node and the second data node that represents a path for transferring data between the first source node and the second data node.

20. A system, comprising:

a computing device; and a computer-readable storage device coupled to the computing device and having instructions stored thereon which, when executed by the computing device, cause the computing device to perform operations comprising:

importing knowledge elements, the knowledge elements include an infrastructure context, analytics scripts, and a composite ontology, uploading information about the infrastructure context, the analytics scripts, and the composite ontology resulting in knowledge, wherein the knowledge is represented in a knowledge graph having an initial state representing disjoint knowledge instances of data sources, and wherein the knowledge graph includes a set of nodes, the set of nodes including:

analysis nodes, each analysis node representing an analysis, data nodes, each data node representing a computational resource, and ontology nodes, each ontology node representing an axiom of a data ontology;

connecting, in an interlace step, sources of information to create a knowledge graph instance of the knowledge graph, wherein the knowledge graph instance represents a raw data mesh, wherein the raw data mesh is a fully connected graph, with the analysis nodes connected to any data nodes that represent computational resources that are available to perform the analysis, wherein the interlace step includes connecting the analysis nodes with other analysis nodes, wherein the interlace step includes connecting the data nodes with the analysis nodes to generate a default setting for all analysis availability on the data nodes, and wherein the interlace step includes connecting the data nodes with the ontology nodes by mapping a data schema to an ontology schema;

applying rules and constraints to limit the connections of the analysis nodes to the data nodes, generating a functional data mesh by applying the rules to identify a set of computational resources to support the analysis, and wherein the functional data mesh includes, for each analysis node, a direct or indirect connection to at least one data node;

optimizing the functional data mesh to generate a recommended data mesh, wherein optimizing the functional data mesh includes removing the data nodes that are not needed for deploying the recommended data mesh;

obtaining an updated knowledge graph representing a recommended data mesh, the updated knowledge graph comprising a computer-readable data structure and including nodes and connections between the nodes;

and determining, using the updated knowledge graph, an access strategy and a synchronization strategy for performing an analysis, by, automatically:

identifying, within the updated knowledge graph, a first source node representing a source of a data element on which the analysis is to be performed, identifying, within the updated knowledge graph, a first data node representing a computational resource on which the analysis is to be run, identifying, within the updated knowledge graph, a second data node representing a computational resource on which the data element is to reside, determining the access strategy between the first source node and the second data node, and determining the synchronization strategy between the first data node and the second data node.

* * * * *